R. H. McNEE.
CUTTER BAR MECHANISM.
APPLICATION FILED JUNE 17, 1916.
1,275,062.
Patented Aug. 6, 1918.
3 SHEETS—SHEET 1.
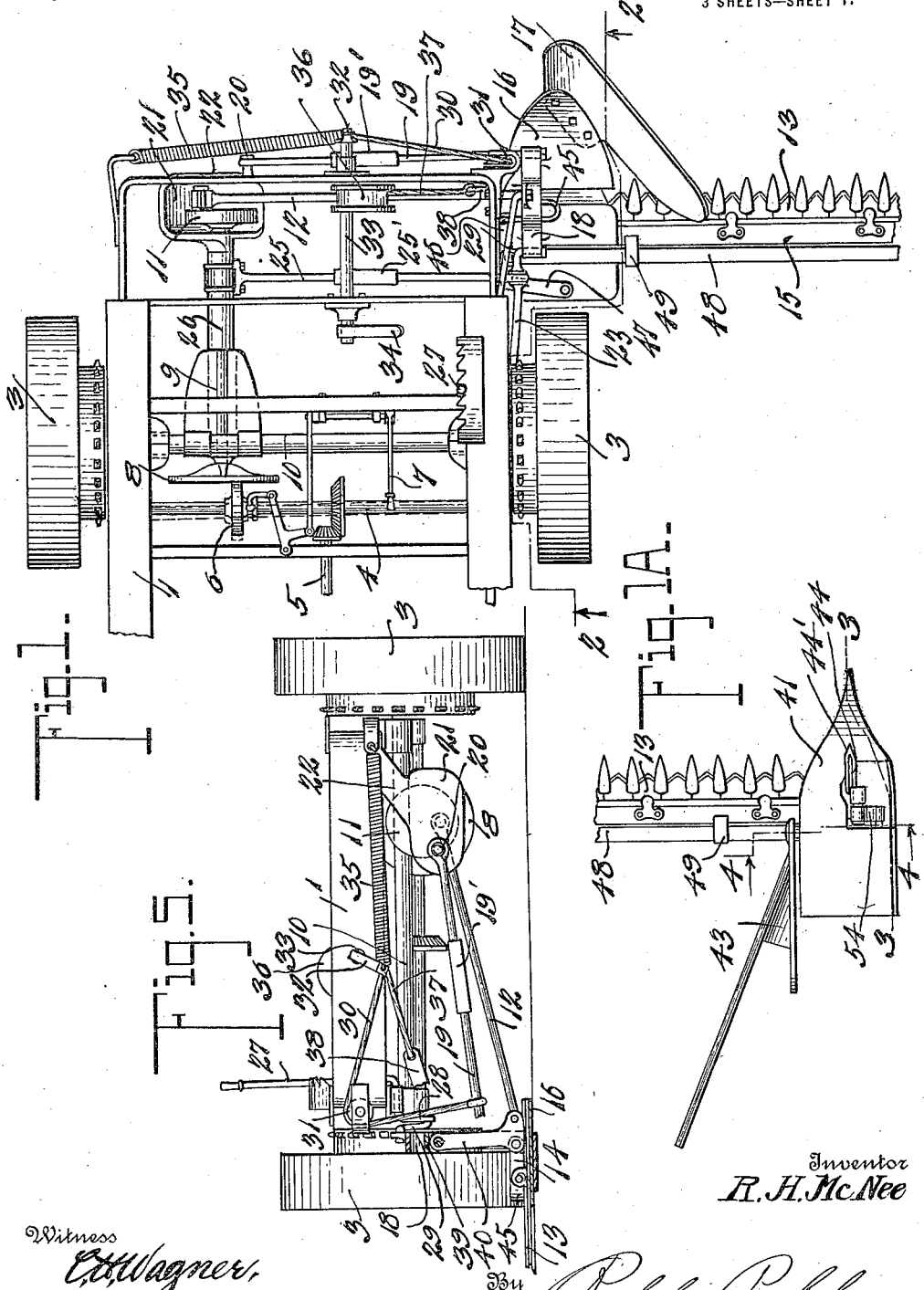
Witness
C. H. Wagner
Inventor
R. H. McNee
By Robert Cobb
Attorney

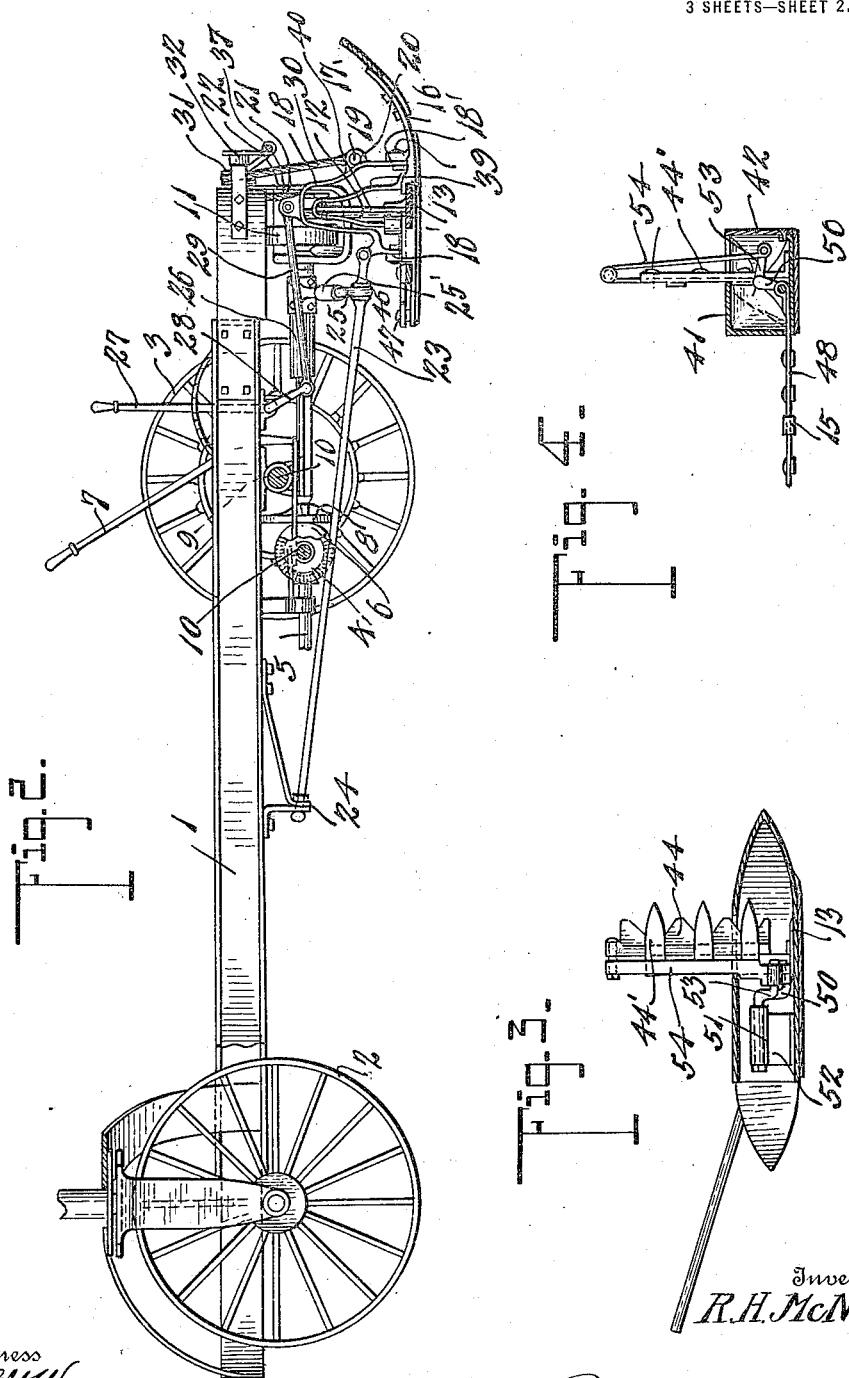

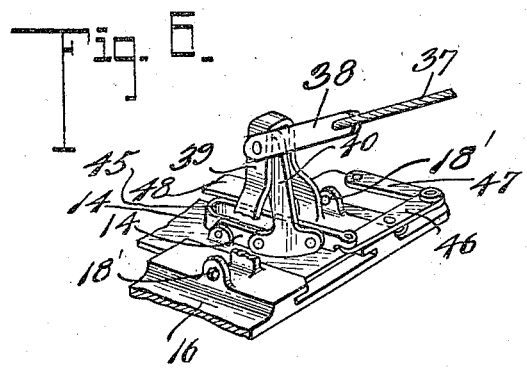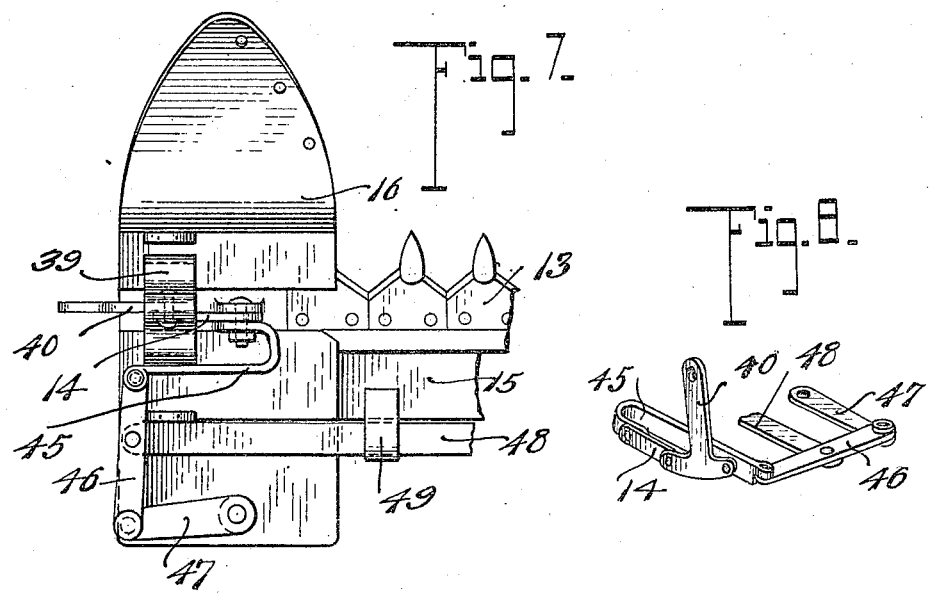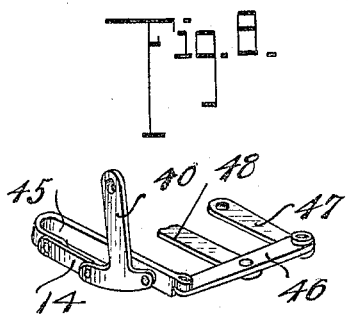

UNITED STATES PATENT OFFICE.

ROBERT H. McNEE, OF NYSSA, OREGON.

CUTTER-BAR MECHANISM.

1,275,062.  Specification of Letters Patent.  Patented Aug. 6, 1918.

Application filed June 17, 1916. Serial No. 104,247.

*To all whom it may concern:*

Be it known that I, ROBERT H. MCNEE, a citizen of the United States, residing at Nyssa, in the county of Malheur and State of Oregon, have invented certain new and useful Improvements in Cutter-Bar Mechanism, of which the following is a specification.

The present invention appertains to improvements in agricultural implements, and in particular to mowers of a type designed to be motor propelled.

The essence of the invention lies mainly in the cutter bar mechanism and the means for adjusting and controlling said mechanism. To this end it is contemplated to provide the cutter bar with novel lifting instrumentalities so arranged as to effect a relative elevation of the bar both at its outer and inner ends simultaneously.

Another object in view is to provide actuating means for the sickle operatively connected thereto in such a manner as to permit the sickle to be driven at substantially any angle of adjustment of the cutter bar for the purpose of preventing likelihood of damage or undue strain on the parts when the bar is shifted for clearing obstructions or raised into inoperative position with respect to the surface over which the machine is operated.

A still further object is to provide an auxiliary cutter driven by the main cutter operating instrumentalities and arranged at the outer portion of the main cutter so as to insure severance of the grass at this end and leave a well defined track or swath that permits the operator to mow the full width of the cutter bar at each round of the field.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a fragmentary top plan view of a mower constructed in accordance with my invention.

Fig. 1A is a fragmentary plan of the outer end portion of the cutter bar.

Fig. 2 is a longitudinal sectional view taken on the plane indicated by the line 2—2 of Fig. 1.

Fig. 3 is a transverse sectional view on the line 3—3 of Fig. 1A.

Fig. 4 is a sectional view on the line 4—4 of Fig. 1A.

Fig. 5 is a front elevation, parts being broken away and shown in section.

Fig. 6 is a fragmentary perspective view of the head portion of the cutter bar showing the inner yoke member and the operative connections for the auxiliary sickle more clearly.

Fig. 7 is an enlarged top plan view of the main shoe.

Fig. 8 is a detail perspective view of the operative connections intermediate the main sickle and the auxiliary sickle.

Throughout the following detail description, and on the several figures of the drawings, similar parts are referred to by like reference characters.

Referring to the drawings and specifically describing this apparatus, the implement in its embodiment consists of the main frame 1 which is supported at its rear end by the tractor guide wheel 2 and at its forward portion by the ground or driving wheels 3, the latter being actuated or chain driven from a motor mounted upon the frame but not illustrated in the drawings. The guide instrumentalities for actuating the wheel 2 are also omitted as these parts do not constitute any portion of the invention herein to be fully set forth.

The cutter bar mechanism which is the subject matter of this application is arranged at the forward extremity of the vehicle frame and is designed to be driven from the transverse shaft 4 actuated by the drive shaft 5 which in turn is driven by the motor. The shaft 4 carries a shiftable friction disk 6 controlled by the operating lever 7 mounted upon the frame, said disk 6 coacting with a large friction drive disk 8 fixed to the inner extremity of the crank shaft 9 supported by the drive axle 10. The outer end of the crank shaft 9 is provided with the balance or pitman wheel 11 to which the pitman rod 12 is connected at one end. The pitman rod 12 at its other end is operatively connected to the head of the main horizontally arranged sickle 13 through the instrumentality of a connecting link 14. This link is an important feature of the driving mechanism for the cutter or sickle 13 for the reason that, as hereinbefore premised, the cutter may be driven irrespective of the angle at which the cutter bar 15 may be tilted. It is particularly disadvantageous in many of the types of mowers to have the sickle rendered inoperative when the cutter bar is adjusted for clearing an obstruction lying in its path. When the actuating mechanism is accidentally thrown into gear with the cutter bar elevated into inoperative position in such constructions, it is not infrequent that a breakage of the parts occurs. The link 14 above referred to in my construction eliminates these objections, it will be obvious to those skilled in the art to which this invention refers.

The cutter bar 15 is provided at its inner end with the main shoe 16 which is preferably provided with the fender 17. As indicated at 18′ the lower extremities of the hanger 18 are pivotally connected to the main shoe 16 and to the forward side of this hanger is connected a transverse rod 19 which at its other end is pivotally connected at 20 to the face of the shield 21 for the pitman wheel 11, said shield being suspended from the frame by the arm 22. The rear side of the hanger has connected thereto a radius rod 23 suspended at its rear end from the frame 1 by the bracket 24 to which it is adjustably connected. This rod 23 sustains the stress rearwardly on the cutter bar mechanism during cutting operation. The lateral stress is taken care of by the transverse rod 19 and a corresponding transversely arranged rod 25 which is loosely connected at one end to the housing 26 for the crank shaft 9 and at its other end to the radius rod 23. The rods 19 and 25 are provided with turn buckles 19′ and 25′ to enable proper adjustment of their lengths. As clearly shown in Fig. 2 of the drawings the cutter bar is capable of being tilted by means of the adjusting lever 27 which operates the rock shaft 28 connected by the link 29 to the upper end of the hanger 18. By moving this lever forwardly or rearwardly the cutter bar is caused to be rocked upon its suspension means which at one side consists of the radius rod 23 and at its other side of the cable 30, the latter being connected at one end to an end portion of the transverse rod 19, passing over a pulley 31 mounted upon the front extremity of the frame and connected at its other end to the arm 32 of a rearwardly extending shaft 33. The shaft just mentioned is provided with a lifting lever 34 designed particularly to be foot operated and the yieldable spring 35 is connected to the arm 32 and this shaft so as to balance the weight of the cutter bar in a customary manner.

At an intermediate point the shaft 33 is provided with a cam wheel 36 to which one end of a cable 37 is connected and this cable at its other end is operatively connected by a link 38 pivoted to the inner yoke 39 fixedly mounted upon the main shoe 16 as shown in Fig. 6. This yoke is positioned in the same vertical plane as the outer yoke or hanger 18. It will be obvious that upon movement of the lever 34 and rotation of the shaft 33 the cable 37 will be wound upon the cam 36 which is eccentrically carried by the shaft 33, in turn pulling upon the inner fixed yoke 39, thereby lifting the cutter bar upon the pivots 18′ forming the pivotal connection to the hanger 18.

At this point it should be noted the inner yoke 19 sustains the arm 40 which is pivotally connected thereto and which forms the intermediate connection between the lower end of the pitman rod 12 and the link 14 hereinbefore referred to. This arm 40 maintains the link 14 in proper position for transmitting reciprocation to the cutter bar through the actuation of the pitman 12.

Reverting to the lifting action of the cutter bar through rotation of the lever 34, it will be apparent that owing to the connection 30 with the transverse rod 19 the inner end of the cutter bar will be proportionately or relatively raised at the same time the outer end is lifted by the cable 37 as above described, so that the cutter bar is bodily raised in a horizontal position, during the initial actuation. This is particularly desirable inasmuch as the bar may be easily raised to pass an obstruction and when raised maintained in a desirable position so that the extent of lifting action does not materially affect the height of cutting of the grass as is true with respect to those lifting operations of conventional cutters wherein the cutter bar is raised at the outer end only. But as the shaft 33 is further rotated the cam 36 becomes effective quickly raising the cutter bar toward the vertical inoperative position.

The outer extremity of the cutter bar is provided with a dividing shoe 41 in the form of a housing, said housing having a detachable or movable side 42 to permit access to the interior of the shoe. The opposite side of the shoe has pivotally connected thereto the track board 43. Vertically arranged at this end of the cutter bar is an auxiliary sickle 44 which is mounted to reciprocate in a vertical plane on its finger bar 44′ extending upwardly from the dividing shoe 41. This auxiliary cutter is operated by the actuating means for the main sickle 13 as will now be described. To the head of the main sickle 13 is connected a bent link 45 which is in turn connected to one end of a link 46 pivotally connected to the arm 47 carried by the main shoe 16. At an intermediate point in the length of the link 46, the actuating rod 48 is connected, said rod extending longitudinally of the cutter bar at its rear portion. The cutter bar carries guide means 49 for this rod 48 which, it will be observed from Fig. 4 is connected to one arm 50 of a rock shaft 51 supported by the bracket 52 secured to the interior of the dividing shoe. A second arm 53 of the rock shaft 51 actuates a vertically arranged connecting rod 54 which at its upper end is in turn connected to the vertical cutter 44. Reciprocatory motion of the pitman 12 is, therefore, transmitted through the foregoing connections to the vertical cutter 44 which operates simultaneously with the horizontal cutter 13. It is obvious that this vertical cutter serves to sever the grass at the outer end of the cutter bar and to make a distinct line of cut which may readily be followed by the operator of the machine in the next round of the apparatus in performing its work. This is particularly desirable where the grass or grain is very heavy or long and it adequately prevents any liklihood of entangling of the grain with the dividing shoe, quite a usual incident in the operation of the conventional type of mower. Since a clear demarcation of the line is obtained by this arrangement, the main shoe 16 may be operated directly along this line when cutting the next swath and the full benefit of the length of the cutter bar is thus secured since the operator does not have to allow for any misjudgment on his part in respect to the line of cut where grain has fallen over the path taken by the cutter on a previous movement over the field.

It may be added that owing to the use of the frictional drive in this apparatus, the speed of reciprocation of the cutter or cutters can readily be regulated depending upon the speed of operation or movement of the machine and the growth of the grass which is being cut.

Having thus described my invention, what I claim as new is:

1. In combination, a wheeled support, a supporting bar pivotally secured at one end thereto, a cutter bar pivotally secured to the other end of said supporting bar, a shaft mounted upon said wheeled support and having a crank arm at its forward end, a flexible connection between said crank arm and the supporting bar aforesaid, a pulley disposed upon the wheeled support over which said connection is disposed, a hanger fixedly mounted on the cutter bar, a second connection connected to the hanger, a cam mounted on said shaft with which the second connection is connected and operable upon rotation of the shaft to actuate the second connection and impart swinging movement to the cutter bar after the latter has been lifted from normal operative position in parallel relation to the surface of the ground, and sustaining means connected to the crank arm of the shaft.

2. In cutter bar mechanism of the class described, the combination with a cutter bar and a wheeled support therefor, a hanger to which the bar is pivotally connected at one end, a yoke member rigidly secured to the cutter bar and arranged in the same plane beneath the hanger member aforesaid, lifting means for said cutter bar comprising a shaft, and a connection intermediate said shaft and the yoke member aforesaid.

In testimony whereof I affix my signature.

ROBERT H. McNEE.

Witnesses:
GEO. E. WARD,
C. C. WILSON.

Copies of this patent may be obtained for five cents each, by addressing the "Commissioner of Patents, Washington, D. C."